United States Patent
Tan et al.

(10) Patent No.: US 6,308,999 B1
(45) Date of Patent: Oct. 30, 2001

(54) MULTI-MATERIAL HYBRID BUMPER

(75) Inventors: Soo A. Tan, Rochester Hills; Dinesh C. Seksaria, Novi, both of MI (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/120,271

(22) Filed: Jul. 21, 1998

(51) Int. Cl.[7] .................................................. B60R 19/22
(52) U.S. Cl. ........................... 293/109; 293/120; 293/132
(58) Field of Search ................................... 293/102, 120, 293/132, 107, 109, 121

(56) References Cited

U.S. PATENT DOCUMENTS

| | | |
|---|---|---|
| 3,779,592 | 12/1973 | Golze et al. |
| 4,088,357 | 5/1978 | Klie et al. |
| 4,190,712 * | 2/1980 | Flanagan ........................ 293/109 X |
| 4,586,739 | 5/1986 | Loren et al. ......................... 293/120 |
| 4,613,177 | 9/1986 | Loren et al. ......................... 293/120 |
| 4,616,866 | 10/1986 | Loren et al. ......................... 293/120 |
| 4,635,984 | 1/1987 | Loren et al. ......................... 293/120 |
| 4,652,031 | 3/1987 | Loren et al. ......................... 293/120 |
| 4,652,032 * | 3/1987 | Smith ................................. 293/120 |
| 4,714,287 | 12/1987 | Merkle ............................... 293/102 |
| 4,722,563 | 2/1988 | Lore et al. .......................... 293/120 |
| 4,749,613 * | 6/1988 | Yamada et al. ................. 293/109 X |
| 4,974,891 | 12/1990 | Furuta ................................ 293/104 |
| 4,978,562 | 12/1990 | Wycech .................................. 428/71 |
| 4,988,137 | 1/1991 | Fleming ............................. 293/109 |
| 5,067,759 | 11/1991 | Fleming ............................. 293/109 |
| 5,080,410 | 1/1992 | Stewart et al. ..................... 293/102 |
| 5,080,411 * | 1/1992 | Stewart et al. ................ 293/102 X |
| 5,139,297 * | 8/1992 | Carpenter et al. .................. 293/132 |
| 5,265,925 | 11/1993 | Cox et al. .......................... 293/120 |
| 5,271,650 | 12/1993 | Fukuhara et al. .................. 293/120 |
| 5,290,078 * | 3/1994 | Bayer et al. ....................... 293/120 |
| 5,290,079 * | 3/1994 | Syamal ............................... 293/120 |
| 5,385,375 | 1/1995 | Morgan et al. ..................... 293/109 |
| 5,393,111 | 2/1995 | Eipper et al. ...................... 293/109 |
| 5,404,974 | 4/1995 | Thum et al. ........................ 188/372 |
| 5,441,319 | 8/1995 | Oyama et al. ...................... 293/155 |
| 5,498,044 | 3/1996 | Bovellan et al. ................... 293/120 |
| 5,545,361 | 8/1996 | Rosasco ............................. 264/45.2 |
| 5,611,568 | 3/1997 | Masuda .............................. 280/784 |
| 5,658,027 | 8/1997 | Eissinger et al. .................. 293/120 |
| 5,722,708 * | 3/1998 | Jonsson ............................. 293/102 |

FOREIGN PATENT DOCUMENTS

0174483 * 3/1986 (EP) ..................................... 293/109

* cited by examiner

*Primary Examiner*—D. Glenn Dayoan
*Assistant Examiner*—Patricia Engle
(74) *Attorney, Agent, or Firm*—David W. Pearce-Smith

(57) ABSTRACT

A vehicle bumper system having a metallic elongated reinforcing member extending substantially across the width of the vehicle. The reinforcing member can be made from aluminum or steel and has a generally Σ-shaped cross section which is filled with energy-absorbing foam. The Σ-shaped cross section is preferably formed by extrusion. A preferred composition of the reinforcing member is an aluminum alloy selected from the group of 6XXX and 7XXX alloys.

22 Claims, 2 Drawing Sheets

MULTI-MATERIAL HYBRID BUMPER

TECHNICAL FIELD

The present invention relates to a bumper for motor vehicles in which an energy absorbing subsystem is incorporated into the bumper. More particularly, the invention relates to metal bumpers having an energy absorbing subsystem incorporated into the bumper.

BACKGROUND ART

Vehicle bumper systems are generally designed to serve two functions. The first function is to minimize visible permanent damage in the vehicle from low speed contacts with obtacles. Low speed collisions are generally defined as collisions at 5 miles per hour or less. The bumper system should withstand these low speed collisions without visible permanent damage, either to the vehicle bumper system or to the vehicle. Another function of a vehicle bumper system is to manage kinetic energy in a higher speed collision to avoid or reduce injury to the vehicle passengers. High speed collisions are those greater than 5 miles per hour. High speed collisions will likely result in visible permanent damage to either the vehicle bumper system or the vehicle. The way in which kinetic energy from the collision is managed through the bumper system and the vehicle is by providing a known and repeatable collapse of the energy absorbing subsystem.

It is desirable to manufacture a bumper that is both lightweight and have desired strength characteristics. Some current lightweight bumpers are manufactured with injection molded plastic material. Several U.S. patents have published designs for blow molded automotive bumper systems having an integral attaching bracket. The attaching bracket is generally made of metal and serves to attach the bumper system to the vehicle. Two brackets secure the bumper system to the vehicle. Each bracket is generally mounted near the outer edge of the bumper system and serve to transmit collision energy repeatably through the bumper system to the vehicle.

It is useful to provide a vehicle bumper system that has the required stiffness, yet is strong enough to minimize visible permanent damage in low speed collisions. Making bumpers sufficiently rigid to withstand both low speed collisions without visible permanent damage on the outside and higher speed collisions with proper kinetic energy management requires the use of thick blow molded wall sections and thereby increasing material cost and bumper systems' weight.

It has also been known to add foam within a vehicle bumper. Foam energy absorbers have been pre-molded and then assembled in place within the bumper. Use of such pre-molded foam blocks requires the use of adhesives or fasteners and large access holes to attach the foam to the bumper system. It is desirable to place foam within a bumper system without the need for adhesives, fasteners or large access holes.

Accordingly, it would be advantageous to provide a vehicle bumper system that is capable of withstanding low speed collisions without visible permanent damage, while providing an adequately rigid and strong cross-frontal area to controllably transmit kinetic energy from high speed collisions to the vehicle.

The primary object of the present invention is to provide a lightweight bumper for vehicles which avoids the shortcomings of the prior art.

Another objective of the present invention is to provide a bumper system for vehicles which is characterized by a relatively simple manufacture enabling relatively low assembly costs.

Yet another object of the present invention is to provide a bumper for vehicles which lends itself to mass production.

Still another object of the present invention is to provide a bumper for vehicles that is capable of withstanding low speed collisions without visible permanent damage, while fitting in limited packaging space allotted by the car designer.

These and other objects and advantages of the present invention will be more fully understood and appreciated with reference to the following description.

SUMMARY OF THE INVENTION

The foregoing problems are overcome by providing a vehicle bumper system having an elongated reinforcing member extending substantially across the width of the vehicle. The reinforcing member can be made from metal or fiber reinforced plastic and has a generally Σ-shaped cross section which is filled with energy absorbing foam. The Σ-shaped cross section is preferably formed by extrusion. Preferred compositions of the reinforcing member is an aluminum alloy selected from the group of 5XXX, 6XXX and 7XXX alloys. During impact, the foam absorbs some impact energy and distributes the forces of impact to the Σ-shaped cross section of the reinforcement beam so that free ends each rotate in opposite directions inwardly about its center longitudinal axis.

The foregoing vehicle bumper system is manufactured by extruding an aluminum alloy, and then filling the Σ-shaped cross section with an energy absorbing foam. The foam may be injected into the mold containing the Σ-shaped extrusion. The foam material solidifies to the reinforcement beam to form a hybrid bumper assembly.

The present invention allows the hybrid bumper assembly to absorb low speed collisions without visible permanent damage. The foam material in the space/cavity of the Σ-shaped extrusion
- provides resistance to compression and rebound at low speed impact, and
- distributes the forces of impact along the width of the Σ-shaped extrusion.

The invention is suitable for front and rear bumper systems as well as side bumper systems.

BRIEF DESCRIPTION OF THE DRAWINGS

Other features of the present invention will be further described in the following related description of the preferred embodiment which is to be considered together with the accompanying drawings wherein like figures refer to like parts and further wherein.

MODE FOR CARRYING OUT THE INVENTION

The term "Σ-shaped" is used herein to mean a non-hollow cross-section as generally shown in the Figures. This cross section has one set of generally parallel top and bottom sides and an essentially vertical concave section side opposite the open end. As will be discussed below, the concave section bulges toward the open end and preferably does not extend beyond the ends of the generally parallel top and bottom sides.

Figure 1:
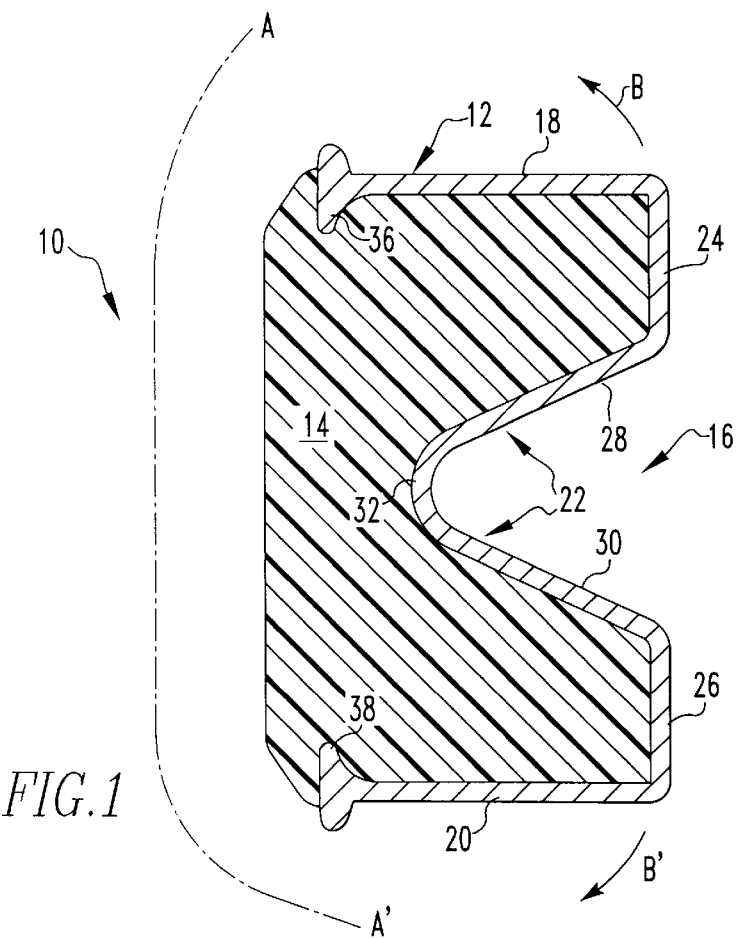
FIG. 1 is a cross-sectional view of a bumper of the present invention showing impact-absorbing foam material filling the cavity of the Σ-shaped extrusion.

Turning first to FIG. 1, there is illustrated a cross-sectional view of a bumper 10 of the present invention showing an elongated Σ-shaped extrusion 12 filled with impact-absorbing foam material 14. The outline of the bumper facia is shown in dotted curved line A-A'.

Elongated Σ-shaped extrusion 12 includes rear wall 16 which is connected to substantially parallel top and bottom walls 18 and 20. Top and bottom walls 18 and 20 are shown to be straight. This is a preferred shape and top and bottom walls 18 and 20 may be slightly concave outward. It is preferred that the angle formed between upper rear section 24 and lower rear section 26 and top and bottom walls 18 and 20 be 90° or less to facilitate the rotation of top and bottom walls 18 and 20 during impact as shown by arrows B and B'. Preferably, top and bottom walls 18 and 20 converge at an angle less than 10°, and most preferably at an angle less than 5°.

Top and bottom walls 18 and 20 are shown to have equal wall thickness. This is a preferred thickness, and top and bottom walls 18 and 20 may be different thickness (not shown) to change the relative amounts of rotation of top and bottom walls 18 and 20 during impact.

Rear wall 16 has three sections, a convex indentation section 22 which separates upper rear section 24 and lower rear section 26. Convex indentation section 22 bulges toward foam material 14. Upper rear section 24 and lower rear section 26 form an angle of approximately 90° or less with top and bottom walls 18 and 20. Although not shown, the corner formed by top wall 18 and upper rear wall 24 and the corner formed by bottom wall 20 and lower rear wall 26 may have a radius. In addition, top and bottom walls 18 and 20 may be either straight (as shown) or slightly curved.

Convex indentation section 22 is centrally located on rear wall 16 and protrudes away from rear wall 16 of Σ-shaped extrusion 12. Preferably, convex indentation section 22 divides Σ-shaped extrusion 12 into two symmetrical sections. However, convex indentation section 22 may be positioned to divide Σ-shaped extrusion 12 into two unequal sections (not shown) to change the relative amount rotation of top and bottom walls 18 and 20 during impact.

Convex indentation section 22 has two walls 28 and 30 which unite at nose 32. Preferably, walls 28 and 30 diverge at an angle greater than 20°, and most preferably at an angle less than 35°. As will be explained below, the impact force compressing foam material 14 on nose 32 of convex indentation section 22 facilitate the rotation of top and bottom walls 18 and 20 during impact and top and bottom walls 18 and 20 rotate further compressing foam 14.

Nose 32 of convex indentation section 26 is arched and extends as a ridge away from rear wall 16 of Σ-shaped extrusion 12. Nose 32 extends from rear wall 16 by about 30% to about 95% the length of top and bottom walls 18 and 20. Preferably, nose 32 extends from rear wall 16 by about 45% to about 80% the length of top and bottom walls 18 and 20. In a most preferred embodiment, nose 32 extends from rear wall 16 by about two thirds the length of top and bottom walls 18 and 20.

Nose 32 is shown to have wall thickness similar to that of the rest of Σ-shaped extrusion 12. This is a preferred shape, and thickness of nose 32 may be thinner (not shown) than other portions of Σ-shaped extrusion 12 to facilitate the rotation of top and bottom walls 18 and 20 during impact.

At the forward end of top and bottom walls 18 and 20 are flanges 36 and 38 which form the ends in the Σ-shaped extrusion 12. Flanges 36 and 38 are preferred since they assist in holding foam material 14 within Σ-shaped extrusion 12.

Elongated Σ-shaped extrusion 12 is preferably formed from a lightweight aluminum alloy capable of resisting deformation. The compositional sales limits for some suitable aluminum alloys are:

TABLE

| Alloy | Si | Mg | Cu | Cr | Mn | Fe | Zn |
|---|---|---|---|---|---|---|---|
| 6013 | .6–1.0 | .8–1.2 | .6–1.1 | .10 max. | .2–.8 | .50 max. | .25 max. |
| 6082 | .7–1.3 | .6–1.2 | .6–1.1 | .25 max. | .40–1.0 | .50 max. | .20 max. |
| 7003 | .30 max | .5–10 | .20 max. | .20 max. | .30 max. | .35 max. | 5.0–6.5 |
| 7108 | .10 max | .7–1.4 | .05 max. | — | .05 max. | .10 max. | 4.5–5.5 |

Other aluminum alloys may be used, but these are believed to have favorable combinations of weight, cost and performance. Elongated Σ-shaped extrusion 12 can also be made from other metals such as steel or fiber reinforced polymeric materials. Fiber reinforcement materials are well known in the art and include ceramic fibers and glass fibers Elongated Σ-shaped extrusion 12 is preferably formed by the metal working process known as extrusion. Extruding metal involves pressing metal stock (ingot or billet) through a die opening having a predetermined configuration opening in order to form a shape having indefinite length and a substantially constant cross section. In the extrusion of aluminum alloys with which this invention is particularly concerned, the aluminum stock is preheated to the proper extrusion temperature. It is then placed into a heated cylinder. The cylinder utilized in the extrusion process has a suitable die at one end which has an opening of the desired shape and a piston or ram having approximately the same cross-sectional dimensions as the bore of the cylinder. This piston or ram moves against the stock to compress the stock. The opening in the die is the path of least resistance for the billet under pressure, and metal deforms and flows through the die opening to produce a continuous extruded product having the same cross-sectional shape as the die opening. Although extrusion is preferred, other suitable metal working means may also be used, including roll forming sheet material and stamping sheet material. Extruding elongated Σ-shaped extrusion 12 with a special cross-section form, and proportion will be less expensive to manufacture than other forming methods. In addition, the curvature or "sweep" in the beam (shown in FIG. 3) does not require the more expensive stretch forming manufacturing technique used with hollow cross section beams.

In the formation of the curvature in the beam, the rear wall 16 may become thinner due to the stretching effect of the bending. However, using extrusions the thickness of rear wall 16 can be increased to compensate for the thinning without the need to increase the thickness of the other walls.

In FIG. 1, rear wall 16, top and bottom walls 18 and 20 and upper rear wall section 24 and lower rear section 26 are all shown to have the same cross sectional thickness. Those skilled in the art will recognize that the extrusion can be designed with a varying thickness to facilitate the deflection of nose 32 and the rotation of top and and bottom walls 18 and 20 and optimize the structural performance of the bumper system. This may be accomplished by varying the thickness of various parts of elongated Σ-shaped extrusion 12.

Holes and slots (not shown) may be incorporated into elongated Σ-shaped extrusion 12 to facilitate attachment of the bumper reinforcement beam to the bracket and to the vehicle. Additional holes and slots (not shown) could be included to facilitate the mounting of other components such as lights and blinker modules. When an open cross section extrusion is used, the forming of such holes and slots can be combined with the beam bending process, thus further reducing manufacturing cost.

Elongated Σ-shaped extrusion 12 is filled with foam material 14. In a preferred embodiment, foam material 14 fills Σ-shaped extrusion 12 and overflows to surround flanges 36 and 38. It is preferred that overflow foam material 14 is symmetrically shaped. However, design considerations and space requirements may necessitate the sculpting of the overflow to form a bulge 40 (see FIG. 2 as an example).

The chemical composition of foam material 14 is not critical to practicing the invention so long as it has the elasto-mechanical characterstics appropriate for absorbing some of the kinetic energy associated with an impact and diffusing and transferring sufficient force to facilitate the rotation of top and bottom walls 18 and 20 during impact. Obviously, the more impact-absorbing foam materials are preferred. The characterstics of a suitable foam depends upon density, load/deflection characterstics, recoverability, thermal stability and recylability.

Impact-absorbing foam material 14 is selected from the group of polymers, metal foams and combinations thereof. High-density polyethylene, polypropylene (PP) and polyurethane (PU) are preferred polymeric materials to use as the impact-absorbing form. Aluminum foam is a preferred metallic foam.

Polyurethane has been found to be a suitable material for the foam material 14. Methods of filling extrusions with foam materials are well known in the art. In a preferred method of placing elongated Σ-shaped extrusion 12 into a mold so that rear wall 16 is downward and nose 32 extends upward. The top of the mold is then positioned and two liquids are simultaneously injected into the mold through a mixing head. The exothermic polymerization of the liquids generates gas which is trapped inside the resulting polymer. This results in a foam formed of solid polymeric material and encapsulated gas pores. Alternative methods may be used to place foam material 14 into elongated Σ-shaped extrusion 12.

During impact, the foam material 14 is contained in and constrained by Σ-shaped extrusion 12. This causes foam material 14 to behave stiffer that it would otherwise be in its unconstrained state and yet still cushion the impact. Also, foam 14 widely distributes the impact forces and thus minimizes local stress and deformation in elongated Σ-shaped extrusion 12. At the same time, foam 14 provides support to the top and bottom walls of cross section of elongated Σ-shaped extrusion 12, thereby preventing their local inward collapse. Thus the two components of the system (foam 14 and elongated Σ-shaped extrusion 12) act synergistically to provide a system with performance greater that the simple sum of the performance of each of the components.

During impact, the bumper described makes effective use of the energy-absorbing properties of the foam material 14 which is crushed into the cavity of elongated Σ-shaped extrusion 12 formed by rear wall 16 and top and bottom walls 18 and 20. The crushing of foam material 14 softens the impact before it is transmitted to the elongated Σ-shaped extrusion 12.

As the compressed foam material 14 deforms and crushes, it impacts nose 32 and pushes against inside wall of elongated Σ-shaped extrusion 12. The foam material 14 compresses and partially absorbs the kinetic energy of the impact and reduces the abruptness of the initial impact. In low speed impact, after the kinetic energy is absorbed and the impactor is removed, the bumper 10 rebounds to its normal free state. The rebound results from the stiffness of the composite section comprised of the elongated member 12 and foam 14.

The deformation of foam material 14 and Σ-shaped extrusion 12 will also spread deformation energy into brackets 42 and 44 and cause metal top and bottom walls 18 and 20 to rotate as nose 32 is crushed against sloping wall 28 and 32. The load is directed outward causing the top and bottom walls 18 and 20 of metal Σ-shaped extrusion 12 to rotate in opposite directions. The rotation of top and bottom walls 18 and 20 along the length of Σ-shaped extrusion 12 absorbs the impact and reduces total kinetic energy available to deform Σ-shaped extrusion 12 into the vehicle. The rotation of top and bottom walls 18 and 20 absorbs the kinetic energy, protects the vehicles occupants and greatly decreases the likelihood of visible permanent damage to the body of the vehicle.

Lips 36 and 38 improve the buckling resistance of top and bottom walls 18 and 20 and entraps the foam material 14 within the cavity of Σ-shaped extrusion 12 thus causing them to work together. This entrapment causes the foam to go into a three dimensional state of compression, which make foam material 14 stiffer and thus more able to improve the performance of the bumper system.

Figure 2:
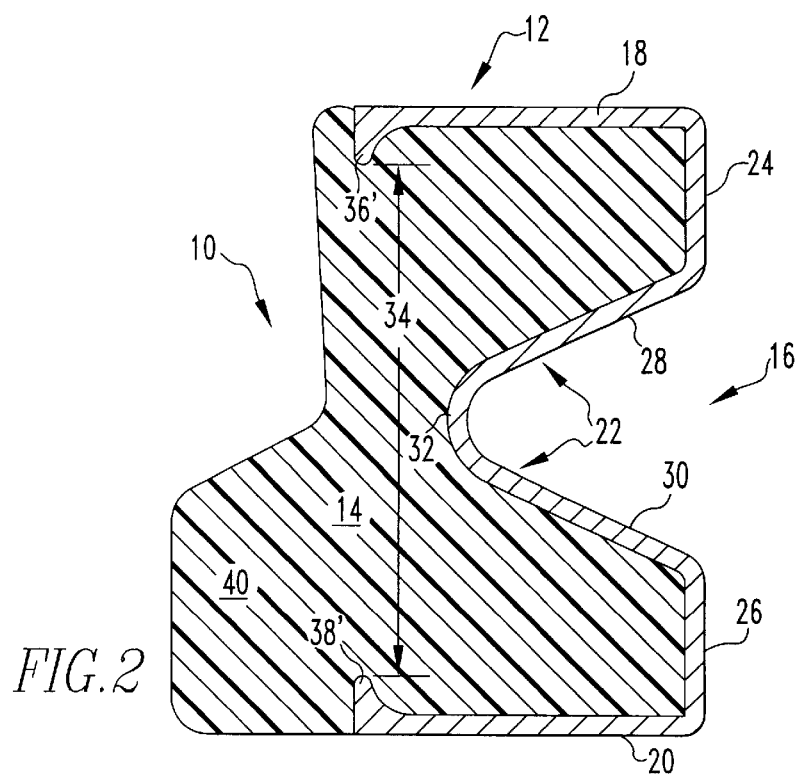
FIG. 2 is a cross-sectional view of an alternative embodiment of the bumper of the present invention.

Turning next to FIG. 2, there is illustrated a cross-sectional view of an alternative embodiment of bumper 10 of the present invention. In this embodiment, impact-absorbing form-filling material 14 extends outward from opening 34 formed from lips 36' and 38' of elongated Σ-shaped extrusion 12 and bulges at 40. In addition, flanges 36' and 38' are truncated as compared to flanges 36 and 38 in FIG. 1.

Figure 3:
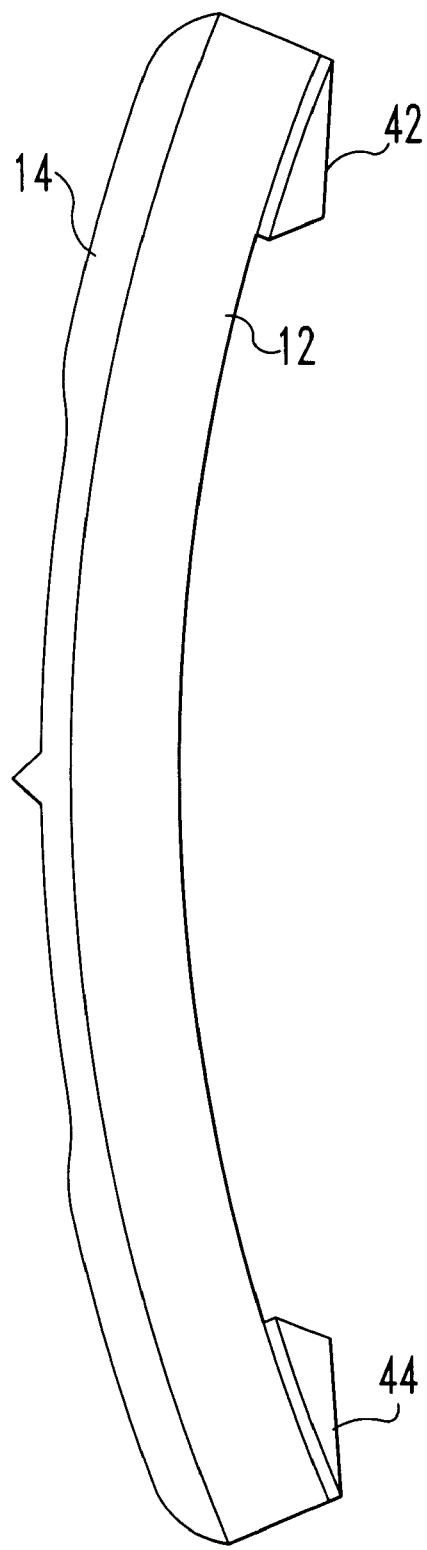
FIG. 3 is a plan view of the bumper system of the present invention.

FIG. 3 is a top view of the bumper of FIG. 2. Σ-shaped extrusion 12 has a bend or "sweep"to conform to the styling of the vehicle. Wedge-shaped brackets 42 and 44 mount on top and bottom walls 18 and 20 (FIG. 1) and attach bumper 10 to the vehicle. Foam material 14 is sculpted to conform to the vehicle design.

Although the metal extrusion has been described as being Σ-shaped with a rear wall having two flat sections, it is contemplated that other configurations may be used. Thus for example, the extrusion may be Σ-shaped with the sloping wall of the middle section of wall 16 ending at top and bottom walls 18 and 20.

Although the Σ-shaped configuration has been described as being a metal extrusion, it is contemplated that other forming methods may be used. Thus for example, the Σ-shaped configuration may be formed by roll forming, press forming. In addition, versions using fiber reinforced materials can be made using molding or pultrusion methods in a die press.

Although the central portion of the rear wall has been described in terms of a convex indentation section 22 having two walls 28 and 30 which unite at nose 32, it is contemplated that the portions of convex indentation section may be continuous and form an ellipse that is arched and extends away from rear wall.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

What is claimed is:

1. A vehicle bumper assembly comprising:
   a) an elongated reinforcing member having a generally Σ-shaped cross section along its length, said generally Σ-shaped cross section comprises a rear wall connected to a substantially parallel top and bottom wall, said generally Σ-shaped cross section having an open face opposite said rear wall which faces bumper assembly fascia; and
   b) foam filling said elongated reinforcing member along its length;
wherein during an impact, said foam absorbs some impact energy and distributes impact forces to said generally Σ-shaped cross section such that said top and bottom walls rotate in opposite directions inwardly about a center longitudinal axis of said reinforcing member.

2. The vehicle bumper assembly of claim 1 in which said Σ-shaped cross section comprises a rear wall connected to substantially parallel top and bottom walls, said rear wall having three sections:
   i. a convex indentation section; and
   ii. two end sections which form angles with said top and bottom walls.

3. The vehicle bumper assembly of claim 1 in which said Σ-shaped cross section comprises a rear wall connected to substantially parallel top and bottom walls, said rear wall having three sections:
   i. two end sections which form approximately 90° angles with said top and bottom walls; and
   ii. a convex indentation section centrally located on said rear wall between said two end sections.

4. The vehicle bumper assembly of claim 1 in which said Σ-shaped cross section comprises a rear wall connected to substantially parallel top and bottom walls, said rear wall having three sections:
   i. two end sections which form approximately 90° angles with said top and bottom walls; and
   ii. a convex indentation section centrally located on said rear wall between said two end sections, said convex indentation protruding into said Σ-shaped cross section and dividing said Σ-shaped cross section into two symmetrical sections.

5. The vehicle bumper assembly of claim 1 in which said Σ-shaped cross section comprises a rear wall connected to substantially parallel top and bottom walls, said rear wall having three sections:
   i. two end sections which form approximately 90° angles with said top and bottom walls; and
   ii. a convex indentation section centrally located on said rear wall between said two end sections, said convex indentation extending the length of elongated Σ-shaped cross section.

6. The vehicle bumper assembly of claim 1 in which said elongated reinforcing member is formed by extrusion.

7. The vehicle bumper assembly of claim 1 in which said elongated reinforcing member is formed by roll forming.

8. The vehicle bumper assembly of claim 1 in which said elongated reinforcing member is formed by press forming.

9. The vehicle bumper assembly of claim 1 in which said elongated reinforcing member is an aluminum alloy.

10. The vehicle bumper assembly of claim 1 in which said elongated reinforcing member is an aluminum alloy selected from the group consisting of 5XXX, 6XXX and 7XXX alloys.

11. The vehicle bumper assembly of claim 1 in which said elongated reinforcing member is a steel alloy.

12. The vehicle bumper assembly of claim 1 in which said elongated reinforcing member is fiber reinforced.

13. The vehicle bumper assembly of claim 1 in which said elongated reinforcing member is a fiber reinforced plastic material.

14. The vehicle bumper assembly of claim 1 in which said Σ-shaped cross section comprises a rear wall connected to substantially parallel top and bottom walls, said substantially parallel top and bottom walls converging as they extend away from said rear wall.

15. The vehicle bumper assembly of claim 1 in which said Σ-shaped cross section comprises a rear wall connected to substantially parallel top and bottom walls, said substantially parallel top and bottom walls converging at angle of less than 5° as they extend away from said rear wall.

16. A vehicle bumper comprising:
   (a) an elongated bumper reinforcing member having a generally Σ-shaped cross section, said Σ-shaped comprises a rear wall connected to substantially parallel top and bottom walls, said rear wall having three sections:
      i. two end sections which form approximately 90° angles with said top and bottom walls; and
      ii. a convex indentation section centrally located on said rear wall between said two end sections, said convex indentation protruding from said rear wall a distance equal to about 30% to about 95% the length of said top and bottom walls; and
   (b) foam filling said elongated reinforcing member;
wherein during an impact, said foam absorbs some impact energy and distributes impact forces to said generally Σ-shaped cross section such that said top and bottom walls rotate in opposite directions inwardly about a center longitudinal axis of said reinforcing member.

17. A vehicle bumper assembly comprising:
   (a) an elongated reinforcing member having a generally Σ-shaped cross section along its length, said generally Σ-shaped cross section having an open face which faces bumper assembly fascia, said Σ-shaped cross section comprises a rear wall connected to substantially parallel top and bottom walls, said rear wall having three sections:
      i. two end sections which form approximately 90° angles with said top and bottom walls; and
      ii. a convex indentation section centrally located on said rear wall between said two end sections, said convex indentation protruding from said rear wall a distance equal to about 45% to about 80% the length of said top and bottom walls; and
   (b) foam filling said elongated reinforcing member;
wherein during an impact, said foam absorbs some impact energy and distributes impact forces to said generally Σ-shaped cross section such that said top and bottom walls rotate in opposite directions inwardly about a center longitudinal axis of said reinforcing member.

18. A vehicle bumper assembly comprising:
   (a) an elongated reinforcing member having a generally Σ-shaped cross section, said Σ-shaped cross section comprises a rear wall connected to substantially parallel top and bottom walls, said substantially parallel top and bottom walls having no curvature and converging as they extend away from said rear wall; and (b) foam filling said elongated reinforcing member;

wherein during an impact, said foam absorbs some impact energy and distributes impact forces to said generally Σ-shaped cross section such that said top and bottom walls rotate in opposite directions inwardly about a center longitudinal axis of said reinforcing member.

19. A vehicle bumper assembly comprising:
(a) an elongated aluminum alloy reinforcing member having a generally Σ-shaped cross section along its length with an open face which faces bumper assembly fascia, said Σ-shaped cross section comprises a rear wall connected to substantially parallel top and bottom walls, said rear wall having three sections:
  i. a convex indentation section; and
  ii. two end sections which form approximately 90° angles with said top and bottom walls; and
(b) foam filling said elongated reinforcing member along its length, said foam is a polymer selected from the group consisting of polyurethane, polypropylene materials, and combination thereof;

wherein during an impact, said foam absorbs some impact energy and distributes impact forces to said generally Σ-shaped cross section such that said top and bottom walls rotate in opposite directions inwardly about a center longitudinal axis of said reinforcing member.

20. The vehicle bumper assembly of claim 19 in which said Σ-shaped cross section comprises a rear wall connected to substantially parallel top and bottom walls, said substantially parallel top and bottom walls converging as they extend away from said rear wall.

21. A vehicle bumper assembly comprising:
(a) an elongated aluminum alloy reinforcing member having a generally Σ-shaped cross, said Σ-shaped cross section comprises a rear wall connected to substantially parallel top and bottom walls, said rear wall having three sections:
  i. a convex indentation section; and
  ii. two end sections which form approximately 90° angles with said top and bottom walls; and
(b) foam filling said elongated reinforcing member along its length, said foam is a polymer selected from the group consisting of polyurethane, polypropylene materials, and combinations thereof;

wherein during an impact, said foam absorbs some impact energy and distributes impact forces to said generally Σ-shaped cross section such that said top and bottom walls rotate in opposite directions inwardly about a center longitudinal axis of said reinforcing member.

22. The vehicle bumper assembly of claim 21 in which said Σ-shaped cross section comprises a rear wall connected to substantially parallel top and bottom walls, said substantially parallel top and bottom walls converging at angle of less than 5° as they extend away from said rear wall.

* * * * *